No. 867,959. PATENTED OCT. 15, 1907.
P. V. & L. G. ERICSON.
LINE DRIER.
APPLICATION FILED NOV. 20, 1906.
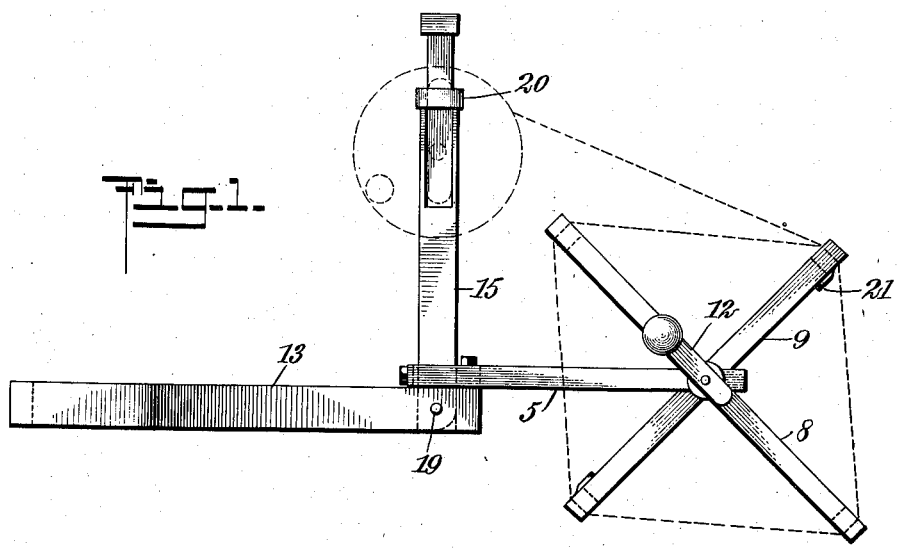
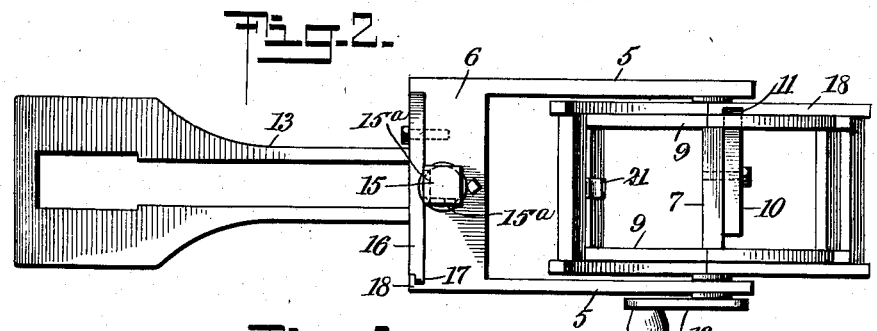
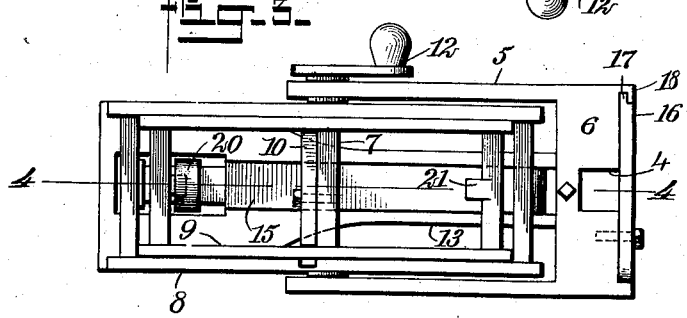
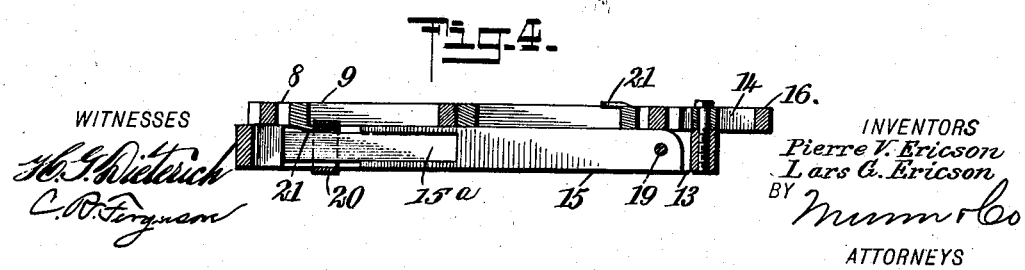
WITNESSES
INVENTORS
Pierre V. Ericson
Lars G. Ericson
BY
ATTORNEYS

UNITED STATES PATENT OFFICE.

PIERRE V. ERICSON AND LARS G. ERICSON, OF NEW YORK, N. Y., ASSIGNORS OF ONE-FOURTH TO SAID PIERRE V. ERICSON, ONE-FOURTH TO SAID LARS G. ERICSON, ONE-FOURTH TO BRUTUS FARNER, AND ONE-FOURTH TO RICHARD H. DAYS, OF NEW YORK, N. Y.

LINE-DRIER.

No. 867,959.  Specification of Letters Patent.  Patented Oct. 15, 1907.

Application filed November 20, 1906. Serial No. 344,259.

*To all whom it may concern:*

Be it known that we, PIERRE V. ERICSON and LARS G. ERICSON, both citizens of the United States, and residents of the city of New York, Hollis, borough of Queens, in the county of Queens and State of New York, have invented a new and Improved Line-Drier, of which the following is a full, clear, and exact description.

This invention relates to improvements in devices particularly designed for drying fish lines, an object being to provide a device of this character on which a line, drawn from a reel, may be wound in such a manner that the line will be exposed to a free circulation of air, and thus quickly and thoroughly dried.

Another object is to so construct the device that it may be compactly folded when not in use.

We will describe a line drier embodying our invention and then point out the novel features in the appended claims.

Reference is to be had to the accompanying drawings forming a part of this specification, in which similar characters of reference indicate corresponding parts in all the figures.

Figure 1 is a side elevation of a line drier embodying our invention; Fig. 2 is a plan thereof; Fig. 3 is a plan showing the drier folded; and Fig. 4 is a section on the line 4—4 of Fig. 3.

The main frame of the line drier comprises side members 5 connected at one end by a cross bar 6, and arranged in the opposite or forward end of the main frame is a shaft 7 carrying the line drying reel, said drying reel comprising a frame 8 rigidly connected to the shaft 7 and a frame 9 which is arranged to swing on said shaft so that it may be turned into the frame 8 when the device is not in use or turned outward at right angles thereto when a line is to be wound upon the reel, and when in such position, that is, the frames at right angles to each other, they are held by means of a locking bar 10 pivoted to the shaft 7 and adapted to engage its end in a notch 11 formed in one of the side members of the frame 8. When the two frames are folded together the locking device 10 may be swung into the space between the side members of the frame 9. On one end of the shaft 7 is a crank handle 12. Pivotally connected to the cross bar 6 of the main frame is a skeleton frame 13, the pivotal connection between the frame 13 and said main frame being such that the skeleton frame may swing underneath the main frame. The cross bar 6 is provided with a notch 14 for receiving a reel supporting post 15 when in upright position, the said reel post being held in such upright position by a locking bar 16 pivotally connected to the cross bar 6 and is here shown having a reduced end portion 17 for engaging in a notch in a projection 18 of the main frame. This reel supporting post 15 has pivotal connection 19 with the skeleton frame 13, so that when the device is not in use the said post may be swung into said skeleton frame.

The reel post is provided at its sides with depressions 15ª to receive reel plates, the said depressions being of various lengths or sizes to accommodate the post to different sizes or forms of reels, and movable on the post is a locking ring 20.

In the operation, when the parts are arranged for the winding of a line on the drying reel, a person operating the same places the skeleton frame 13 on a chair or the like, and sits upon it, thus holding the device firmly, so that his hands are free to wind the drying reel and to guide the line from the fish line reel. When the device is folded the parts may be locked together by engaging the ring 20 with a lug 21 on the reel frame 9.

Having thus described our invention, we claim as new and desire to secure by Letters Patent:

1. A line drying device, comprising a main frame, a drying reel consisting of two frames, one arranged to fold within the other, a frame extended from the main frame, and a reel post intermediate the main frame and the frame extending therefrom.

2. A line drying device, comprising a main frame, a shaft arranged therein, a drying reel consisting of a frame member rigidly attached to the shaft and a frame member mounted to swing on the shaft, means for locking said drying reel frame members in position at right angles to each other, a skeleton frame having swinging connection with the main frame, and a swinging reel post on the skeleton frame and adapted to fold therein.

3. A line drying device, comprising a main frame, a shaft mounted in the main frame, a drying reel consisting of a frame member rigidly attached to the shaft, and a frame member having swinging connection with the shaft and adapted to fold within the first-named reel frame member, one of the side members of the main frame being provided with a notch, a locking bar mounted to swing on the shaft and adapted to engage its end in said notch, a skeleton frame having swinging connection with the main frame, a reel post having swinging connection with the skeleton frame and adapted to fold therein, and means for locking the reel post in upright position.

4. A line dryer, comprising a main frame having a cross bar at one end provided with a notch, a folding drying reel mounted in the main frame, a skeleton frame having swinging connection with said cross bar, a reel post having pivotal connection with the skeleton frame and adapted to engage in said notch of the cross bar when in upright position, and a locking bar mounted to swing on said cross bar for holding the reel post in upright position.

In testimony whereof we have signed our names to this specification in the presence of two subscribing witnesses.

PIERRE V. ERICSON.
LARS G. ERICSON.

Witnesses:
BRUTUS FARNER,
RICHARD H. DAYS.